(12) United States Patent
Frazier et al.

(10) Patent No.: US 9,189,365 B2
(45) Date of Patent: Nov. 17, 2015

(54) HARDWARE-ASSISTED PROGRAM TRACE COLLECTION WITH SELECTABLE CALL-SIGNATURE CAPTURE

(71) Applicant: INTERNATIONAL BUSINESS MACHINES CORPORATION, Armonk, NY (US)

(72) Inventors: Giles R. Frazier, Austin, TX (US); David S. Levitan, Austin, TX (US); Brian R. Mestan, Austin, TX (US); Mauricio J. Serrano, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 59 days.

(21) Appl. No.: 14/069,769

(22) Filed: Nov. 1, 2013

(65) Prior Publication Data
US 2014/0059523 A1 Feb. 27, 2014

Related U.S. Application Data

(63) Continuation of application No. 13/300,863, filed on Nov. 21, 2011, now abandoned, which is a continuation-in-part of application No. 13/214,352, filed on Aug. 22, 2011, now Pat. No. 8,756,582.

(51) Int. Cl.
*G06F 9/44* (2006.01)
*G06F 11/34* (2006.01)
*G06F 11/36* (2006.01)

(52) U.S. Cl.
CPC .......... *G06F 11/3466* (2013.01); *G06F 11/348* (2013.01); *G06F 11/3636* (2013.01); *G06F 2201/83* (2013.01); *G06F 2201/865* (2013.01)

(58) Field of Classification Search
CPC . G06F 11/3636; G06F 11/3466; G06F 11/34; G06F 11/3419
USPC .......................................................... 717/128
See application file for complete search history.

(56) References Cited

U.S. PATENT DOCUMENTS

| | | |
|---|---|---|
| 5,381,533 A | 1/1995 | Peleg et al. |
| 5,875,324 A | 2/1999 | Tran et al. |

(Continued)

OTHER PUBLICATIONS

U.S. Appl. No. 13/079,189, filed Apr. 4, 2011, Frazier, et al.

(Continued)

*Primary Examiner* — Li B Zhen
*Assistant Examiner* — Hui-Wen Lin
(74) *Attorney, Agent, or Firm* — Mitch Harris, Atty at Law, LLC; Andrew M. Harris; Steven L. Bennett

(57) ABSTRACT

Hardware-assisted program tracing is facilitated by a processor that includes a root instruction address register, a program trace signature computation unit and a call signature register. When a program instruction having an address matching the root instruction address register is executed, a program trace signature is captured in the call signature register and capture of branch history is commenced. By accumulating different values of the call signature register, for example in response to an interrupt generated when the root instruction is executed, software that performs program tracing can obtain signatures of all of the multiple execution paths that lead to the root instruction, which is also specified by software in order to set different root instructions for program tracing. In an alternative implementation, a storage for multiple call signatures is provided in the processor and read at once by the software.

12 Claims, 7 Drawing Sheets

(56) References Cited

U.S. PATENT DOCUMENTS

| | | | |
|---|---|---|---|
| 5,970,439 | A | 10/1999 | Levine et al. |
| 6,170,083 | B1 | 1/2001 | Adl-Tabatabai |
| 6,253,338 | B1 | 6/2001 | Smolders |
| 6,351,844 | B1 | 2/2002 | Bala |
| 6,513,133 | B1* | 1/2003 | Campbell .................. 714/38.14 |
| 6,539,500 | B1 | 3/2003 | Kahle et al. |
| 6,647,491 | B2 | 11/2003 | Hsu et al. |
| 6,920,549 | B1 | 7/2005 | Ukai |
| 7,000,095 | B2 | 2/2006 | Jeppesen et al. |
| 7,076,640 | B2 | 7/2006 | Kadambi |
| 7,103,877 | B1 | 9/2006 | Arnold et al. |
| 7,243,350 | B2 | 7/2007 | Lindwer |
| 7,315,795 | B2 | 1/2008 | Homma |
| 7,490,229 | B2 | 2/2009 | Tremblay et al. |
| 7,496,908 | B2 | 2/2009 | DeWitt, Jr. et al. |
| 7,603,545 | B2 | 10/2009 | Sunayama et al. |
| 7,657,893 | B2 | 2/2010 | Armstrong et al. |
| 7,694,281 | B2 | 4/2010 | Wang et al. |
| 7,765,387 | B2 | 7/2010 | Sunayama et al. |
| 7,949,854 | B1 | 5/2011 | Thaik et al. |
| 8,042,007 | B1 | 10/2011 | Chan et al. |
| 8,261,244 | B2* | 9/2012 | Pietrek .......................... 717/130 |
| 8,281,304 | B2 | 10/2012 | Kimura |
| 8,407,518 | B2 | 3/2013 | Nelson et al. |
| 8,612,730 | B2 | 12/2013 | Hall et al. |
| 2002/0066081 | A1 | 5/2002 | Duesterwald et al. |
| 2005/0081107 | A1* | 4/2005 | DeWitt et al. .................... 714/38 |
| 2005/0132363 | A1 | 6/2005 | Tewari et al. |
| 2005/0210454 | A1 | 9/2005 | DeWitt et al. |
| 2005/0223364 | A1* | 10/2005 | Peri et al. ....................... 717/128 |
| 2006/0005180 | A1 | 1/2006 | Nefian et al. |
| 2006/0080531 | A1* | 4/2006 | Sinha et al. .................... 713/168 |
| 2006/0168432 | A1 | 7/2006 | Caprioli et al. |
| 2006/0253837 | A1* | 11/2006 | Hudson et al. ................. 717/124 |
| 2007/0294592 | A1 | 12/2007 | Ashfield et al. |
| 2008/0086597 | A1 | 4/2008 | Davis et al. |
| 2008/0171598 | A1* | 7/2008 | Deng ............................. 463/40 |
| 2008/0222632 | A1 | 9/2008 | Ueno et al. |
| 2009/0037709 | A1 | 2/2009 | Ishii |
| 2009/0254919 | A1 | 10/2009 | Jayaraman et al. |
| 2010/0017791 | A1 | 1/2010 | Finkler |
| 2010/0100774 | A1* | 4/2010 | Ding et al. ....................... 714/45 |
| 2010/0306764 | A1 | 12/2010 | Khanna |
| 2011/0107071 | A1 | 5/2011 | Jacob (Yaakov) |
| 2012/0005462 | A1 | 1/2012 | Hall |
| 2012/0005463 | A1 | 1/2012 | Mestan et al. |
| 2012/0254670 | A1 | 10/2012 | Frazier et al. |
| 2012/0254837 | A1 | 10/2012 | Frazier et al. |

OTHER PUBLICATIONS

U.S. Appl. No. 13/163,964, filed Jun. 20, 2011, Abrams, et al.

U.S. Appl. No. 12/828,697, filed Jul. 1, 2010, Hall, et al.

Shi, et al., "Analyzing the Effects of Trace Cache Configurations on the Prediction of Indirect Branches", Journal of Instruction-Level Parallelism, Feb. 2006, pp. 1-24, Raleigh, NC.

Zagha, et al.,"Performance Analysis Using the MIPS R10000 Performance Counters", Proceedings of the 1996 ACM/IEEE Conference on Supercomputing, Nov. 1996, 20 pages (pp. 1-20 in pdf), Pittsburgh, PA.

Nataraj, et al., "Ghost in the Machine: Observing the effects of Kernel Operation on Parallel Application Performance", International Conference for High Performance Computing, Networking, Storage and Analysis, Nov. 2007, 12 pages (pp. 1-12 in pdf), Reno, NV.

Anonymous, "Fast Identification of Previously-retrieved Callstacks", ip.com document IPCOM000200962D, Nov. 2010, 3 pages (pp. 1-3 in pdf).

Intel 64 and IA-32 Software Developer's Manual, vol. 3A: System Programming, Mar. 2010, 812 pages (pp. 1-812 in pdf), US.

Intel Itanium2 Processor Reference Manual for Software Development and Optimization, May 2004, 196 pages (pp. 1-196 in pdf), US.

"Intel 64 and IA-32 Architectures Optimization Reference Manual", Jun. 2011, 774 pages (pp. 1-774), US.

Bala, et al., "Dynamo: A Transparent Dynamic Optimization System", In Proceedings of Programming Language Design and Implementation (PLOD), 2000, pp. 1-12, US.

Bond, et al., "Probabilistic Calling Context", In Proceedings of Object Oriented Programming Systems Languages and Applications (OOPSLA) 2007, 15 pages (pp. 1-15 in pdf), US.

Odaira, et al., "Efficient Runtime Tracking of Allocation Sites in Java", In Proceedings of Virtual Execution Environments (VEE), 2010, 12 pages (pp. 1-12 in pdf), US.

Lu, et al., "Design and Implementation of a Lightweight Dynamic Optimization System", Journal of Instruction Level Parallelism, Apr. 2004, pp. 1-24, US.

Merten, et al., "A Hardware-Driven Profiling Scheme for Identifying Program Hot Spots to Support Runtime Optimization", Proceedings of the 26th Annual Symposium on Computer Architecture (ISCA) pp. 136-147, May 1999, Atlanta, US.

Rotenberg, et al., "Trace cache: a low latency approach to high bandwidth instruction fetching", Proceedings of the 29th Annual IEEE/ACM International Symposium on Microarchitecture, Dec. 2-4, 1996, pp. 24-34, xii+359, IEEE Comput. Soc. Press, Paris, FR.

Jacobson, et al., "Trace Preconstruction", Proceedings of 27th International Symposium in Computer Architecture, Jun. 14, 2000, pp. 37-46, ACM vi+328, Vancouver, BC, CA.

Patel, et al., "Improving trace cache effectiveness with branch promotion and trace packing", Proceedings of the 1998 25th Annual International Symposium on Computer Architecture, Jun. 27-Jul. 1, 1998, pp. 262-271, IEEE Computer Soc. Press, Barcelona, ES.

Yeh, et al., "Increasing the instruction fetch rate via multiple branch prediction and a branch address cache", ICS 1993 Proceedings of the 7th International Conference on Supercomputing, Jul. 1993, pp. 67-76, Tokyo, JP.

Liu, "Predict Instruction Flow Based on Sequential Segments", IBM Technical Disclosure Bulletin, Apr. 1991, pp. 66-69, vol. 33, No. 11.

Mars, et al., "MATS: Multicore Adaptive Trace Selection", IEEE/ACM International Symposium on Code Generation and Optimization (CGO), 3rd Workshop on Software Tools for MultiCore Systems, Apr. 6, 2008, 6 pages (pp. 1-6 in pdf), Boston, MA.

Merten, et al., "A Hardware Mechanism for Dynamic Extraction and Relayout of Program Hot Spots", Proceedings of the 27th Annual International Symposium on Computer Architecture, May 2000, pp. 59-70, vol. 28, Issue 2, Vancouver, BC, Canada.

Office Action in U.S. Appl. No. 12/828,697 mailed on Feb. 7, 2013, 27 pages (pp. 1-27 in pdf).

Final Office Action in U.S. Appl. No. 12/828,697 mailed on Jun. 12, 2013, 12 pages (pp. 1-12 in pdf).

Office Action in U.S. Appl. No. 13/300,863 mailed on Dec. 4, 2014, 38 pages (pp. 1-38 in pdf).

* cited by examiner

HARDWARE-ASSISTED PROGRAM TRACE COLLECTION WITH SELECTABLE CALL-SIGNATURE CAPTURE

This U.S. Patent Application is a Continuation of U.S. patent application Ser. No. 13/300,863 filed on Nov. 21, 2011 and published as U.S. Patent Publication No. 20130055033 on Feb. 28, 2013, which is a Continuation-in-Part of U.S. patent application Ser. No. 13/214,352 filed on Aug. 22, 2011, and published as U.S. Patent Publication No. 20130054942 on Feb. 28, 2013.

BACKGROUND OF THE INVENTION

1. Field of the Invention

The present invention is related to hardware-assisted program tracing, and more specifically to a processor and method that capture a call signature when a specified root instruction is executed, and optionally when the call signature also has a specified value.

2. Description of Related Art

Run-time program tracing software provides valuable insight as to the actual patterns of execution encountered during program execution. Such information can be used to selectively optimize program code and to inform developers of actual run-time conditions. Information gathered by profiling programs that study program execution can be used by systems' processes to adapt pre-fetching and for run-time optimization of program code organization and storage.

Hardware mechanisms have been used to assist in program tracing, such a branch history table (BHT) storage. The function of the BHT is to identify the program path leading up to an event, such as an interrupt, by including the addresses of the most-recent branch instructions for which the branch was taken leading up to the event. Software subsequently reads the BHT in order to identify the program path leading up to the event.

However, specific hardware mechanisms to support program tracing along specific program paths are not generally present in today's processors.

Therefore, it would be desirable to provide a processor and software that can cooperate to facilitate program tracing and profiling.

BRIEF SUMMARY OF THE INVENTION

The invention is embodied in a method that computes and collects a program call signature within a processor, when a specified root instruction is executed. The method computes the program call signature during program execution to uniquely identify program trace segments between call and return pairs.

The processor includes a root instruction register that is programmed with a root instruction address. When the root instruction is about to be executed, control logic within the processor captures the call signature in a call signature register. The processor may have only a single register for storing the call signature, or multiple storage locations that can store multiple different call signatures. Program tracing software collects branch history information commencing at the root instruction, or at the root instruction only when the call signature matches a call signature stored in the call signature register, or one of the multiple call signature registers, which may be determined based on a selectable operating mode of the processor.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to processors, methods and computer programs for tracing program execution using hardware-assisted program trace collection. The processor includes a register that is programmed with the address of a specified root instruction, and commences capture of branch history information once the root instruction is encountered. The processor also computes a signature that uniquely describes the subroutine call and return history and the value of the signature is captured when the root instruction is executed, in order to identify the sequence of function calls and returns that led to the root instruction. The processor may include a selectable operating mode that governs how capture of the signature is performed. In one operating mode, a program call signature is captured every time the root instruction is executed. After execution has proceeded long enough for the program to reach a steady-state condition, the processor waits for the root instruction to be executed again, and subsequently the taken branches are added to a buffer that stores the trace history. When the buffer fills, the process terminates and software is signaled, e.g., by an interrupt, and reads the branch history that has been collected. In another operating mode, the processor waits until the root instruction is executed and the program call signature matches a particular value before adding the taken branches subsequent to the root instruction to the buffer and then interrupting the program tracing software.

Figure 1:
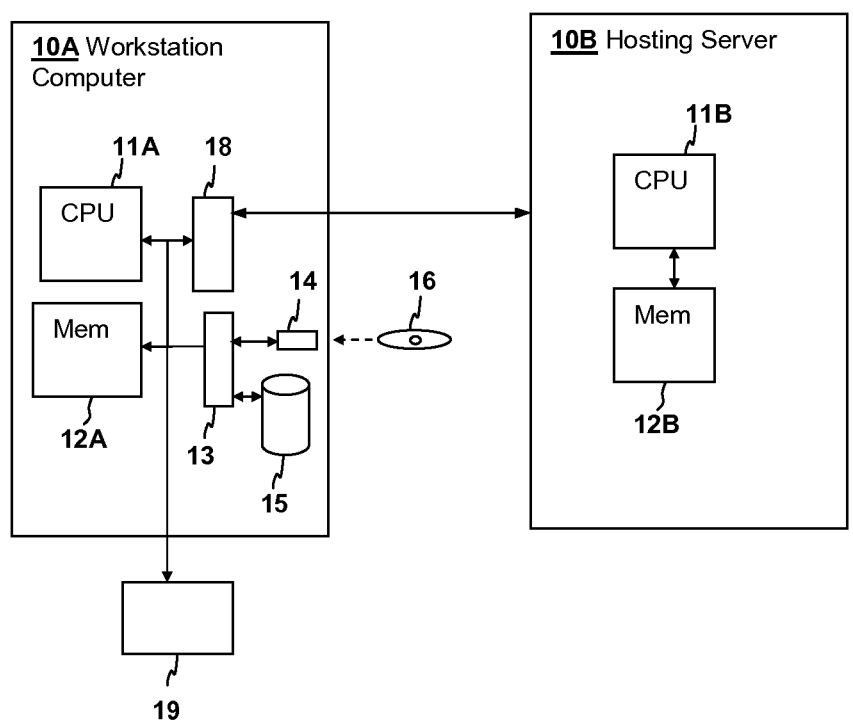
FIG. 1 is a block diagram illustrating a processing system according to an embodiment of the present invention.

Referring now to FIG. 1, a system in accordance with an embodiment of the present invention is shown. The depicted computer system includes a workstation 10A coupled to a hosting server 10B. The depicted computer system configuration is only provided as an illustration of one possible processing system configuration, and processing systems in accordance with other embodiments of the present invention are within the scope of the present invention. In particular, techniques and processors according to the present invention may be employed in either or both of workstation computer system 10A and/or hosting server 10B, as the present invention may be used to profile program code both in small-scale desktop/notebook computer systems, as well as other intelligent personal devices such as smart phones and tablets, and in large-scale system such as a hosting server 10B designed to execute multiple operating system images and applications, such as systems that provide cloud computing services. Within workstation computer, a processor (CPU) 11A is coupled to a memory 12A, which contains program instructions implementing programs for interacting with processor 11A to initialize hardware trace capture mechanisms within processor 11A and to gather program trace information from processor 11A over iterations of execution of program code that is being profiled, or traced for debugging purposes, etc. Alternatively, the evaluating/profiling software may be executed from a memory 12B by a processor 11B in hosting server 10B and interact with processor 11A in workstation computer 10A, may be executed by workstation computer 10A to interact with processor 11B in hosting server or the profiling/debugging program may be executed entirely within a virtualized environment provided by hosting server 10B, as long as access to processor 11B is provided to initialize and manage the hardware trace capture facilities of the present invention.

Processor 11A in workstation computer 10A is coupled to a storage interface 13, which couples processor 11A and memory 12A to storage devices such as hard disc drive 15 and an optical drive 14. Workstation computer 10A is coupled to hosting server 10B via a network interface 18, which may be a wired or wireless interface. Embodiments of the invention include computer program products that interact with the hardware facilities of the present invention, and are stored in memory 12A as well as stored on tangible media such as a CD-ROM 16 that may be inserted into optical drive 14 to transfer the profiling/debugging software, as well as other software components to memory 12A for execution by processor 11A, or in memory 12B for execution by processor 11B. Similar storage devices and interfaces may be provided within hosting server 10B for use in storing and retrieving program code in accordance with an embodiment of the invention. The illustrated processing system also includes input/output (I/O) interfaces and devices 19 such as mice and keyboards for receiving user input and graphical displays for displaying information, such as user interfaces for controlling and examining the results of test code execution within test platform 20. While the system of FIG. 1 is used to provide an illustration of a system for implementing and interacting with embodiments of the present invention, it is understood that computer systems and programs in accordance with an embodiment of the present invention may be embodied in another general-purpose or special-purpose computer system that does not include the architectural features shown in FIG. 1.

Figure 2:
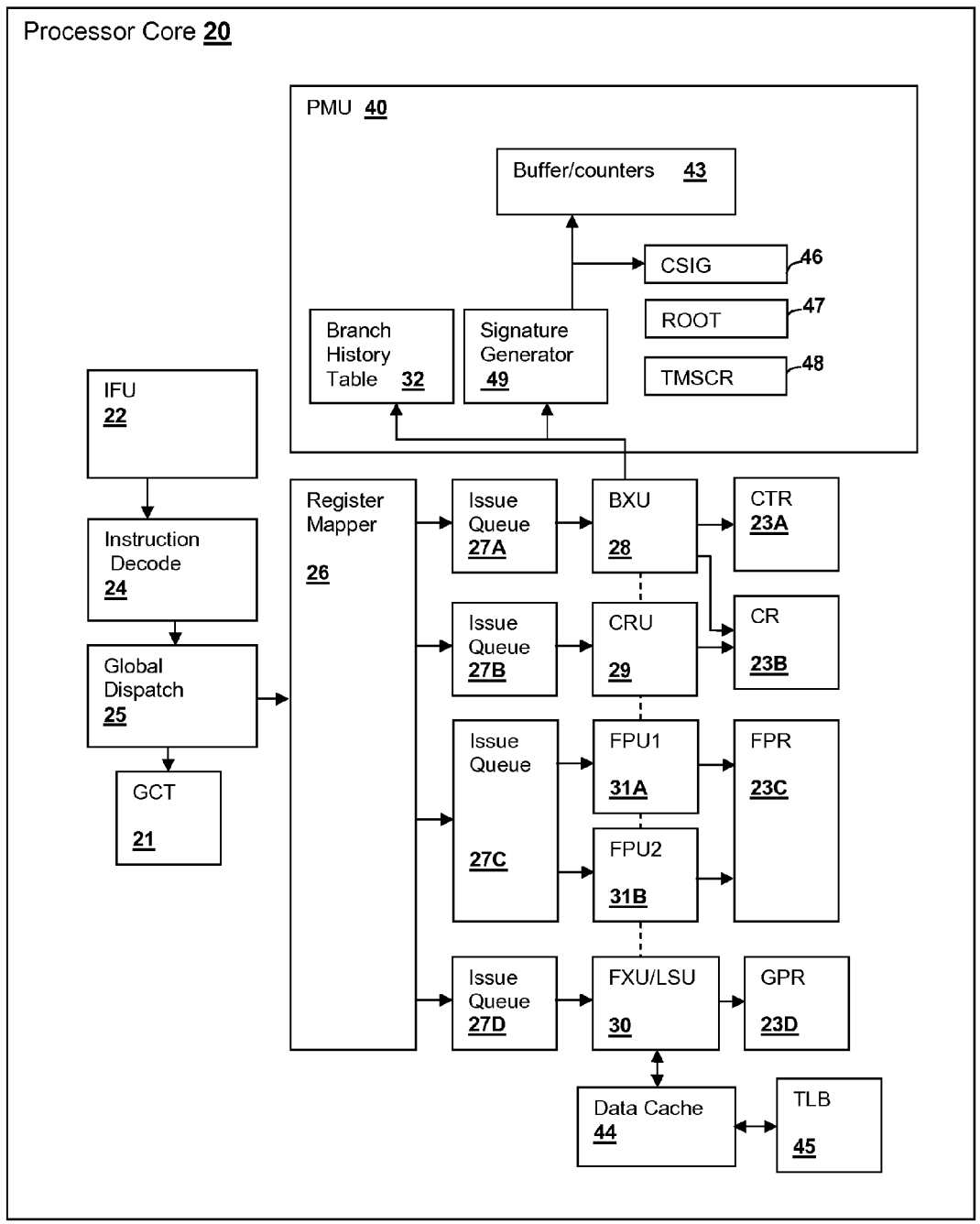
FIG. 2 is a block diagram illustrating a processor according to an embodiment of the present invention.

Referring now to FIG. 2, details of a processor core 20 that may be provided in one or both of processors 11A and 11B of FIG. 1 are illustrated in accordance with an embodiment of the present invention. Core 20 includes an instruction fetch unit (IFU) 22 that fetches one or more instruction streams from cache or system memory and presents the instruction stream(s) to an instruction decode unit 24. A global dispatch unit 25 dispatches the decoded instructions to a number of internal processor pipelines. The processor pipelines each include a register mapper 26, one of issue queues 27A-27D, and an execution unit provided by branch execution unit (BXU) 28, condition result unit (CRU) 29, fixed-point unit load-store unit (FXU/LSU) 30 or floating point units (FPUs) 31A-31B. Registers such as counter register (CTR) 23A, condition register (CR) 23B general-purpose registers (GPR) 23D, and floating-point result registers (FPR) 23C provide locations for results of operations performed by the corresponding execution unit(s). A global completion table (GCT) 21 provides an indication of pending operations that is marked as completed when the results of an instruction are transferred to the corresponding one of result registers 23A-23D. Register mappers 26 allocate storage in the various register sets so that concurrent execution of program code can be supported by the various pipelines. FXU/LSU 30 is coupled to a data cache 44 that provides for loading and storing of data values in memory that are needed or modified by the pipelines in core 20. Data cache 44 is coupled to one or more translation look-aside buffers (TLB) 45 that map real or virtual addresses in data cache 44 to addresses in an external memory space.

Processor core 20 includes a performance monitoring unit (PMU) 40 that, among other functions, maintains a branch history table 32 that collects program trace information. In accordance with an embodiment of the present invention, performance monitoring unit (PMU) 40 also includes a signature generator 49 that computes a program call signature at each function call and return, for use in identifying a current execution path of the program code being executed by processor core 20. The program call signature generating function is reversible and based upon the program instruction address of the call instruction, so that the current value of the program call signature, also referred to herein as the working call signature, is modified at execution of the call instruction, and then the modification is undone when the corresponding return instruction is executed. In the particular embodiment of the invention described herein, the address used is the program instruction address after the call instruction, i.e., the return address to which the corresponding return instruction directs execution. However, the call address or another related program instruction address could be used instead. Therefore, during a sequence of nested calls corresponding to a particular program execution path will have a signature determined from the program instruction addresses of the call instructions, but once execution has returned to the top level, the working call signature will be restored to its original value. An example of such a call signature computation function is described in the above-incorporated parent U.S. Patent Application and is also described below for convenience.

A signature generator unit 49 within PMU 40 computes and stores the working call signature (WSIG) according to the following two hashing operations. On CALL instructions, the fixed amount S determines how many positions to rotate the current value of WSIG left and then the return address is rotated right by two positions and combined in a logical XOR operation with the rotated WSIG:

(Hash) WSIG=ROTATE_LEFT (WSIG, S) XOR (RETURN_ADDRESS>>2)

Upon execution of a return instruction, the value of WSIG un-hashed by again combining WSIG with the return address shifted right by two in a logical-XOR operation, which will reverse a previously applied XOR of the same return address and then fixed amount S is used to rotate the result right by S positions, according to the following un-hash operation:

(un-Hash) WSIG=ROTATE_RIGHT (WSIG XOR (RETURN ADDRESS>>2), S).

Working call signature is stored in a field of a call signature register (CSIG) 46. PMU 40 also includes a root instruction register (ROOT) 47 and a trace mode status and control register (TMSCR) 48. ROOT 47 is programmed by program tracing software to trigger capture of WSIG when the instruction address stored in ROOT 47 is reached, in order to obtain a reference call signature RSIG, which is stored in another field of CSIG 46.

Figure 3:
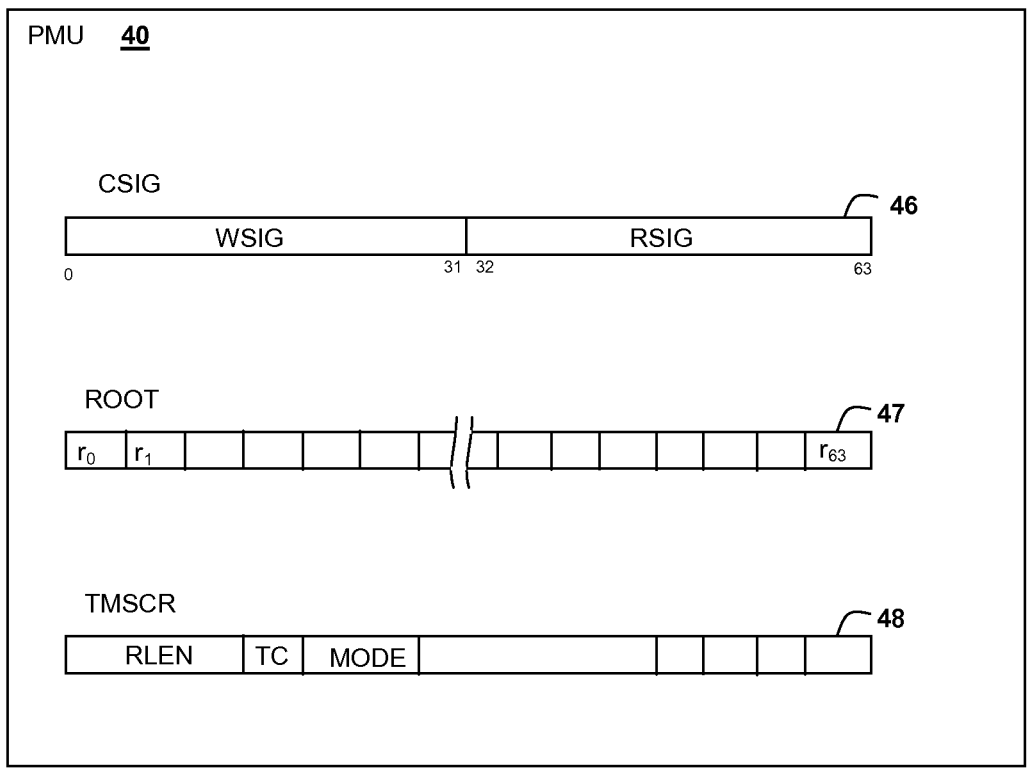
FIG. 3 is a diagram illustrating registers within PMU 43 of the processor depicted in FIG. 2 in accordance with an embodiment of the present invention.

Referring now to FIG. 3, details of the contents of registers within PMU 40 are shown. A mode selected by a MODE field within TMSCR 48 determines whether RSIG is used to qualify triggering of program trace history capture. In a first operating mode, trace capture begins when the root instruction address stored in ROOT 47 is reached. The RSIG field in CSIG 46 is also set to the current value of WSIG when the root instruction address stored in ROOT 47 is reached. In a second operating mode, trace capture begins when the WSIG is equal to RSIG and the root instruction address stored in ROOT 47 is reached. Other operating modes or alternative embodiments include populating a buffer 43 with multiple values of RSIG that are captured as the root instruction address stored in ROOT 47 is reached. Additionally, one or more counters to store a count of the number of times the root instruction was executed with a particular WSIG value can be included in buffer/counters 43. TMSCR 48 also includes a run length RLEN field that is set allow the program to reach a steady-state operating condition before beginning the trace identification process and to limit the number of instructions executed before the tracing process terminates in case the root instruction is never reached, or is never reached with the particular RSIG value after RSIG has been set. TMSCR 48 also includes a flag TC. When the root instruction is a branch instruction, the TC flag specifies whether the BHT is to be filled with the taken branches on the program path for when the branch instruction at the root address was taken or to be filled with the taken branches on the program path for when the branch instruction at the root address was not taken.

Figure 4:
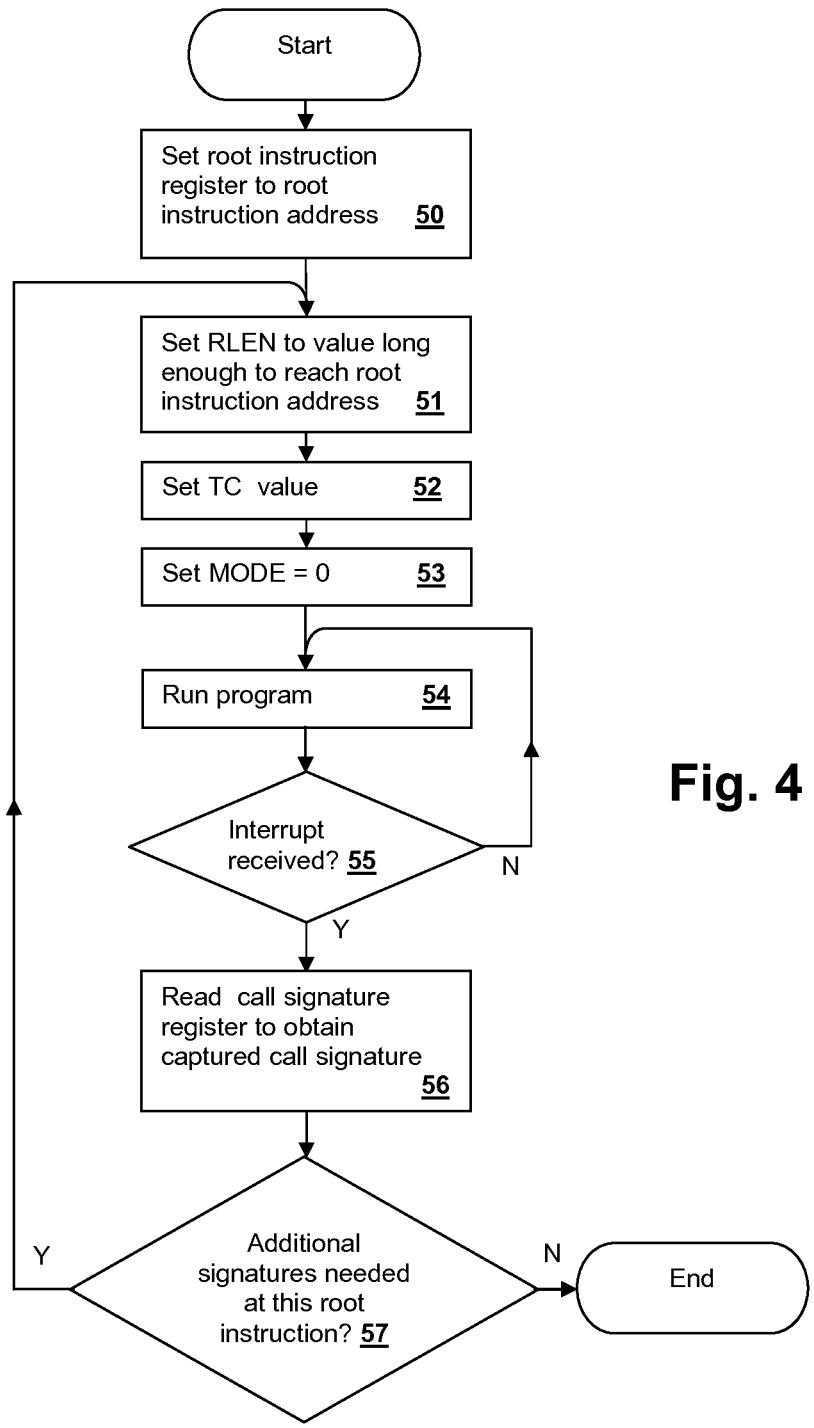
FIG. 4 is a flow chart depicting a method in accordance with an embodiment of the present invention.

Referring now to FIG. 4, a method of operation of a tracing program in accordance with an embodiment of the present invention is illustrated in a flowchart. First, the tracing program sets ROOT 47 to a root instruction address at which the processor will capture one or more RSIG values (step 50). ROOT 47 is generally set to the address of a particular branch instruction at the start of an execution path that the tracing program is examining, e.g., for debugging, verifying or profiling. The RLEN field in TMSCR 48 is set to a run length that should be long enough to allow the program to reach a steady-state operating condition after initialization and to subsequently reach the instruction specified in ROOT 47 (step 51). The TC flag in TMSCR 52 is also set (step 52) to capture the desired program path after the root instruction when the root instruction is a branch, and mode field MODE is set to zero to select the operating mode that triggers capture of RSIG when the instruction specified by ROOT 47 is executed (step 53). The program being analyzed is run (step 54) and when an interrupt is received (decision 55), CSIG 46 is read to obtain the captured call signature (step 56). If more call signatures are needed at the instruction specified by ROOT 47 (decision 57), then steps 51-57 are repeated to capture additional signatures. For example, in embodiments of the invention that capture multiple RSIG values in buffers/counters 43, steps 51-57 may only need to be executed once.

Figure 5:
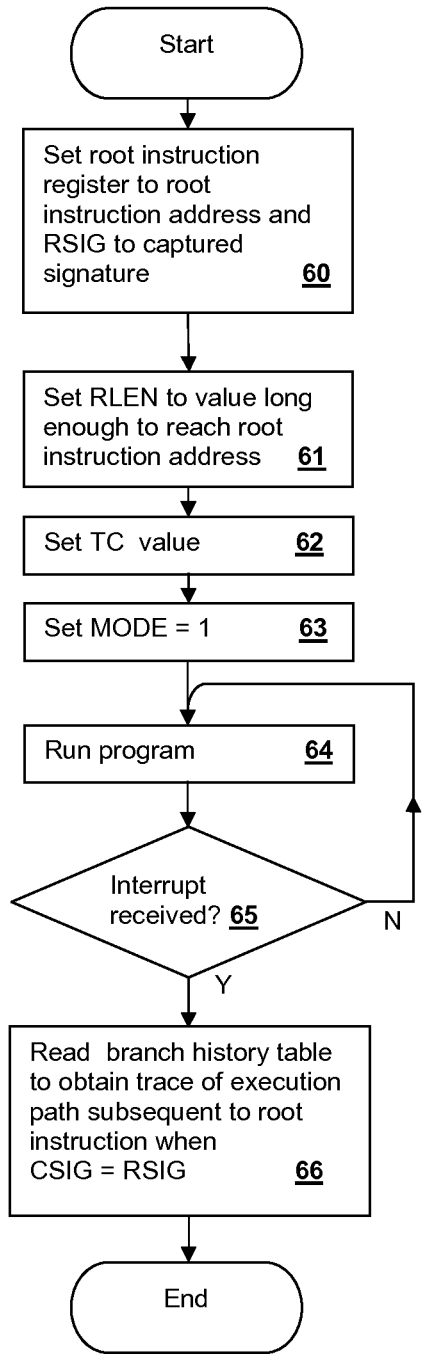
FIG. 5 is a flow chart depicting a method in accordance with an embodiment of the present invention.

Referring now to FIG. 5, a further method of operation of the tracing program in accordance with an embodiment of the present invention is illustrated in a flowchart. The method depicted in FIG. 5 is generally executed after applying the method depicted in FIG. 4, but there are other methods of obtaining RSIG values, such as computing them from the program code, so it is not a requirement that the method depicted in FIG. 4 be used to obtain the RSIG value used in the method of FIG. 5. First, the tracing program sets ROOT 47 to a root instruction address at which the processor will start collecting branch history information and sets the RSIG field to a particular program call signature, such as a signature captured by the method of FIG. 4 (step 60). The RLEN field in TMSCR 48 is set to a run length that should be long enough to capture the desired program path after the root instruction when the root instruction is a branch and to subsequently reach the instruction specified in ROOT 47 with the particular signature (step 61). The TC flag in TMSCR 52 is also set (step 62) to capture the desired program path after the root instruction when the root instruction is a branch, and mode field MODE is set to "1" to select the operating mode that starts capturing program trace information when when the instruction specified by ROOT 47 is executed and WSIG is equal to RSIG (step 63). The program being analyzed is run (step 64) and when an interrupt is received (decision 65), the branch history table 32 is read to obtain the program trace information (step 66). If more traces are needed with different RSIG values or a root instructions, the process depicted in FIG. 5 is repeated.

Figure 6:
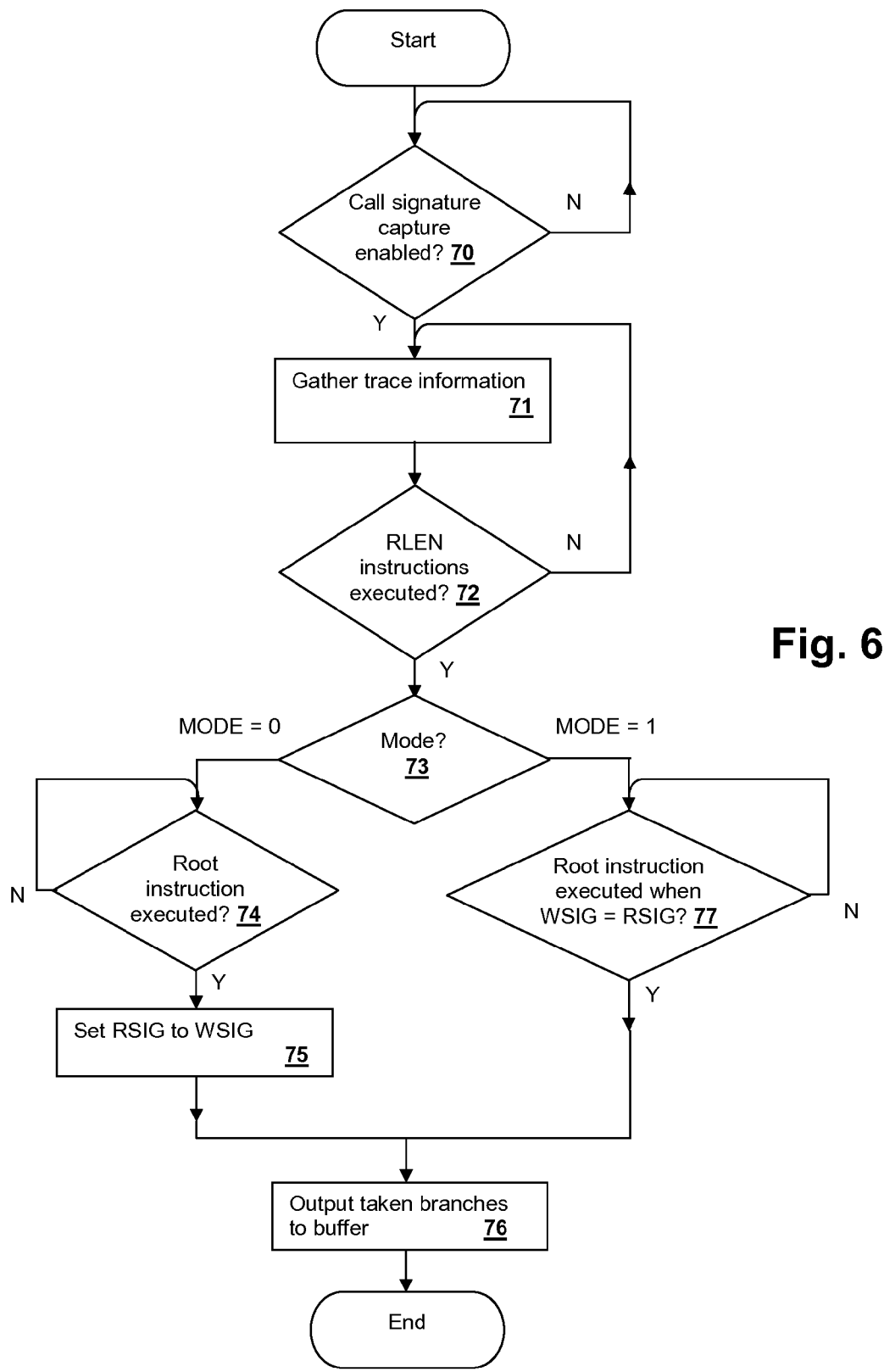
FIG. 6 is a flow chart depicting a method in accordance with another embodiment of the present invention.

Referring now to FIG. 6, a method of operation of a processor in accordance with an embodiment of the present invention is illustrated in a flowchart. Until call signature capture is enabled (decision 70), the method is not performed. Once call signature capture is enabled (decision 70), then trace information is gathered (step 71) and until the number of instructions specified by the RLEN field in TMSCR 48 are executed (decision 72), PMU 40 continues gathering trace information. Once the number of instructions specified by RLEN have been executed (decision 72), if mode 0 is selected (decision 73), once the root instruction is executed (decision 74), then the RSIG field in CSIG 46 is set to the current WSIG value (step 75). Otherwise, if mode 1 is selected (decision 73), once the root instruction is executed with a WSIG equal to the RSIG value (decision 77), then the taken branches are output to a buffer that can be read by the tracing software (step 76).

Figure 7:
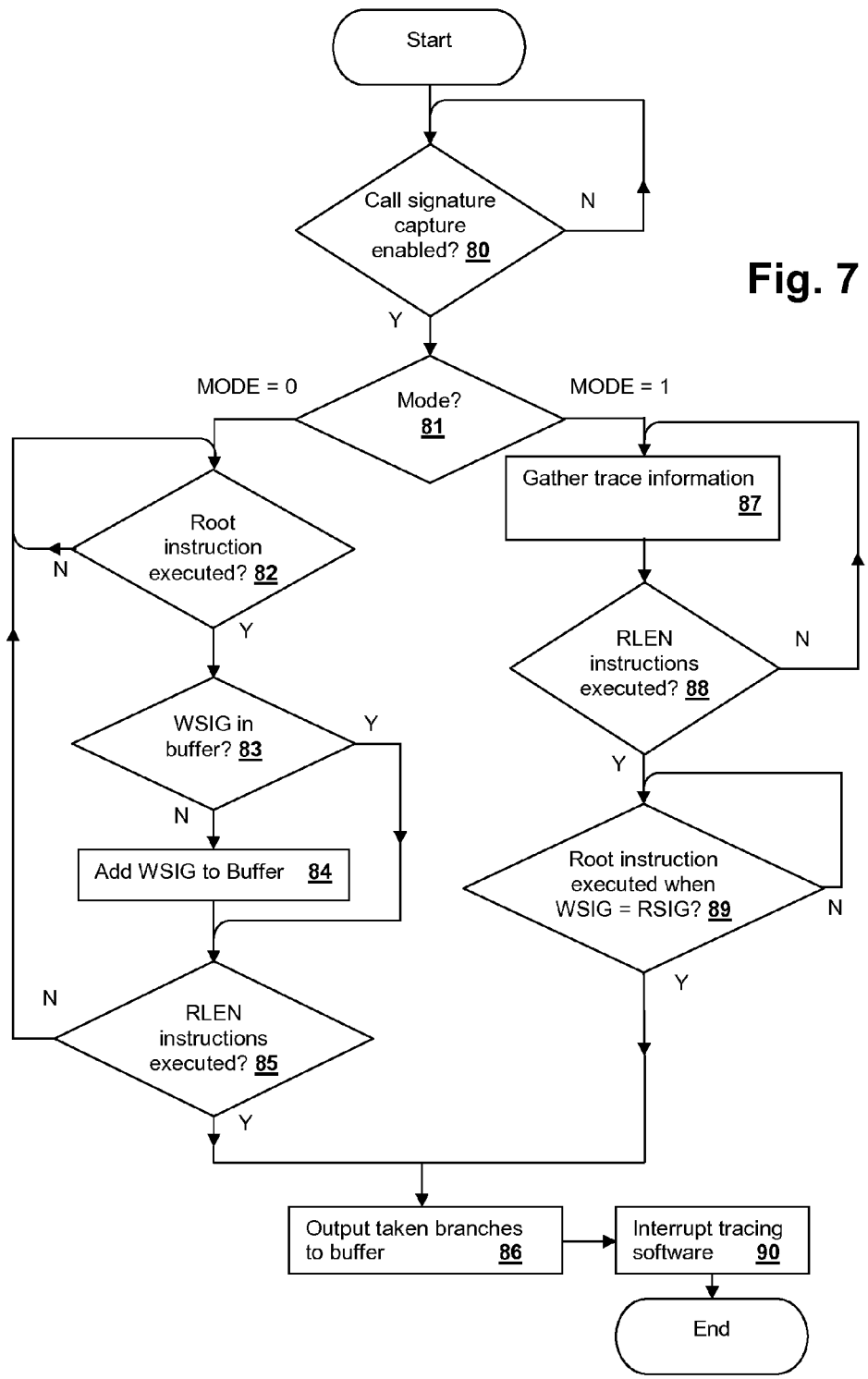
FIG. 7 is a flow chart depicting a method in accordance with another embodiment of the present invention.

Referring now to FIG. 7, an alternative method of operation of a processor in accordance with an embodiment of the present invention is illustrated in a flowchart. The method depicted in FIG. 7 is an alternative to the method depicted in FIG. 4, which uses software to determine the multiple call signature values and determine the most common call signature, etc. The method depicted in FIG. 1 is a method of operation of a processor that includes multiple storage locations for storing multiple RSIG values that occur at a particular root instruction, and thus provides some of the functionality provided by software methods such as FIG. 4, in an alternative hardware implementation. Until call signature capture is not enabled (decision 80), the method is not performed. Once call signature capture is enabled (decision 80), then if mode 0 is selected (decision 81), once the root instruction is executed (decision 82), if the value of the WSIG field is already in the buffer (decision 83), until the number of instructions executed has reached the value of RLEN (decision 85), execution proceeds. If the value of WSIG is not in the buffer (decision 83) it is added to the buffer (step 84). Once the number of instructions executed has reached the value of RLEN (decision 85), the taken branches are output to the program trace buffer (step 86) and the tracing software is interrupted (step 90). If mode 1 is selected (decision 81), program trace information is gathered (step 87) and once the number of instructions executed has reached the value of RLEN (decision 88) and then the instruction specified by ROOT 47 is executed with the value of WSIG equal to the value set in RSIG (decision 89), the taken branches are output to the program trace buffer (step 86) and the tracing software is interrupted (step 90).

As noted above, portions of the present invention may be embodied in a computer program product, which may include firmware, an image in system memory or another memory/cache, or stored on a fixed or re-writable media such as an optical disc having computer-readable code stored thereon. Any combination of one or more computer readable medium(s) may store a program in accordance with an embodiment of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of the present application, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of collecting program trace information of program code executed by a processor, the method comprising:
    selecting a trace capture mode of the processor from a first operating mode and a second operating mode;
    computing a program call signature at program calls and returns within the program code that uniquely identifies a call and return history extending to a currently executing instruction;
    specifying a root instruction at which to collect the program call signature by storing an address of the root instruction in a root instruction register of the processor;
    during execution of the program code, detecting that the execution has reached the root instruction;
    responsive to detecting that the execution has reached the root instruction, storing a current value of the program call signature in a call signature register and commencing capture of program trace information in a branch history buffer as execution of the program code proceeds; and
    responsive to the selecting having selected the first operating mode, specifying a particular value of the program call signature at which to commence the capture of the program trace information, wherein the detecting further detects that a current value of the program call signature matches the particular value of the program call signature when the execution has reached the root instruction, and wherein the commencing capture of program trace information is performed responsive to detecting that the execution has reached the root instruction and that the current value of the program call signature matches the particular value of the program call signature, and wherein responsive to the selecting having selected the second operating mode, the commencing capture is performed responsive to detecting that the execution has reached the root instruction independent of the current value of the program call signature.

2. The method of claim 1, further comprising responsive to a subsequent execution of the root instruction, interrupting the processor, whereby results of the capturing can be obtained from the branch history buffer.

3. The method of claim 1, wherein the storing stores the current value of the program call signature in one of multiple call signature registers forming a call signature buffer, wherein the storing populates the call signature buffer at multiple occurrences of the detecting having detected that the execution has reached the root instruction.

4. The method of claim 1, wherein the computing the program call signature comprises hashing addresses of the program calls with current values of the program call signature as the program calls are encountered and un-hashing the current values of the program call signature with addresses of the program calls when the corresponding program returns are encountered.

5. A processor, comprising:
    an instruction fetch unit for fetching program instructions for execution by functional units within the processor;
    an instruction decoder for decoding the program instructions fetched by the instruction fetch unit;
    an instruction dispatch unit for dispatching the decoded program instructions to the functional units;
    a computation unit for computing a program call signature at calls and returns encountered in the program instructions, wherein the program call signature uniquely identifies a call and return history extending to a currently executing instruction;
    a root instruction register for storing an address of a specified a root instruction at which to collect the program call signature; and
    control logic that, responsive to execution reaching the root instruction, stores the program call signature in a call signature register of the processor and triggers capture of program trace information in a branch history buffer of the processor, wherein the control logic further detects when a current value of the program call signature matches a value of the program call signature stored in the call signature register, and commences triggers capture of the program trace information when the current value of the program call signature matches the value of the program call signature stored in the call signature register and the execution has reached the root instruction, wherein the control logic includes a control register for selecting an operating mode the processor, and wherein the control logic, responsive to selecting a first operating mode of the processor, and further responsive to detecting that the execution has reached the root instruction and that the current value of the program call signature matches the value of the program call signature stored in the call signature register, stores the current value of the call signature register and triggers the capture of the program trace information, and wherein the control logic, responsive to selecting a second operating mode of the processor, stores the current value of the call signature register and triggers the capture of the program trace information when the execution has reached the root instruction independent of the current value of the program call signature.

6. The processor of claim 5, wherein the control logic generates an interrupt responsive to a subsequent execution of the root instruction to signal a program to collect the program call signature and program trace information from the processor.

7. The processor of claim 5, wherein the control logic stores the current value of the program call signature in one of multiple call signature registers forming a call signature buffer and populates the call signature buffer at multiple occurrences of the execution having reached the root instruction.

8. The processor of claim 5, wherein the computation unit computes the program call signature by hashing addresses of the program calls with current values of the program call signature as the program calls are encountered and un-hashing the current values of the program call signature with addresses of the program calls when the corresponding program returns are encountered.

9. A computer system comprising:
a processor for executing program instructions, wherein the processor computes a program call signature at calls and returns encountered in the program instructions, wherein the program call signature uniquely identifies a call and return history extending to a currently executing instruction, and wherein the processor stores the program call signature in a call signature register of the processor and triggers capture of program trace information in a branch history buffer of the processor, when an address of the currently executing instruction matches a root instruction register of the processor, wherein the processor further detects when a current value of the program call signature matches a value of the program call signature stored in the call signature register, and commences triggers capture of the program trace information when the current value of the program call signature matches the value of the program call signature stored in the call signature register and the execution has reached the root instruction, wherein the processor includes a control register for selecting an operating mode of the processor, and wherein the processor, responsive to selecting a first operating mode, and further responsive to detecting that the execution has reached the root instruction and that the current value of the program call signature matches the value of the program call signature stored in the call signature register, stores the current value of the call signature register and triggers the capture of the program trace information, and wherein the processor, responsive to selecting a second operating mode, stores the current value of the call signature register and triggers the capture of the program trace information when the execution has reached the root instruction independent of the current value of the program call signature; and
a memory coupled to the processor for storing the program instructions, wherein the program instructions are program instructions for tracing execution of program code by the processor wherein the program instructions comprising program instructions for specifying the root instruction at which to collect the program trace signature by storing an address of the root instruction in a root instruction register of the processor, and collecting multiple different values of the program call signature during execution of the program code to obtain a complete execution trace for the program code by reading the call signature register of the processor.

10. The computer system of claim 9, wherein the processor generates an interrupt responsive to a subsequent execution of the root instruction to signal a program to collect the program call signature and program trace information from the processor.

11. The computer system of claim 9, wherein the processor stores the current value of the program call signature in one of multiple call signature registers forming a call signature buffer and populates the call signature buffer at multiple occurrences of the execution having reached the root instruction.

12. The computer system of claim 9, wherein the computation unit computes the program call signature by hashing addresses of the program calls with current values of the program call signature as the program calls are encountered and un-hashing the current values of the program call signature with addresses of the program calls when the corresponding program returns are encountered.

* * * * *